United States Patent [19]

Chiou et al.

[11] Patent Number: 5,218,479
[45] Date of Patent: Jun. 8, 1993

[54] ZOOM LENS FIXING MECHANISM

[75] Inventors: Yee-Haur Chiou; Tsai-Jeon Huang; Chen-Chin Cheng, all of Chutung Town, Taiwan

[73] Assignee: Industrial Technology Research Institute, Chutung, Taiwan

[21] Appl. No.: 823,841

[22] Filed: Jan. 21, 1992

[51] Int. Cl.$^5$ .............. G02B 15/14; G02B 7/02
[52] U.S. Cl. .................. 359/700; 359/701; 359/704; 359/826
[58] Field of Search .......... 359/694, 696, 699, 700, 359/701, 702, 704, 826

[56] References Cited

U.S. PATENT DOCUMENTS

| | | | |
|---|---|---|---|
| 3,817,601 | 6/1974 | Colaiace et al. | 359/700 |
| 4,154,510 | 5/1979 | Katagiri | 359/704 |
| 4,759,618 | 7/1988 | Kamata | 359/700 |
| 4,993,815 | 2/1991 | Yamazaki et al. | 359/699 |

Primary Examiner—Bruce Y. Arnold
Assistant Examiner—Evelyn A. Lester
Attorney, Agent, or Firm—W. Wayne Liauh

[57] ABSTRACT

Disclosed herein is an improved zoom lens fixing mechanism comprising a fixing sleeve, a cam sleeve, a front lens holder, a rear lens holder, a back cover, and four rollers, in which the fixing sleeve has a cam slot and three long slots and the cam sleeve has a long slot and three cam slots. The front lens holder has three screw holes and the rear lens holder has one screw hole. During the assembling, or fixing, of the improved zoom lens of the present invention, the rollers are first affixed into respective screw holes. The rollers affixed to the front lens holder are placed into the long slots on the fixing sleeve and the cam slots on the cam sleeve, which also sleeves around the fixing sleeve. Whereas, the roller affixed to the rear lens holder is placed into the cam slot on the fixing sleeve and the long slot on the cam sleeve. All the cam slots and the long slots are connected to recesses in the form of notches or slot openings which extend to a longitudinal end of either the fixing sleeve or the cam sleeve to receive the rollers. The back cover has four pins to be inserted into the recesses to prevent the rollers from falling out of the slots.

1 Claim, 4 Drawing Sheets

5,218,479

ZOOM LENS FIXING MECHANISM

BACKGROUND OF THE INVENTION

The present invention relates to an improved zoom lens fixing mechanism, particularly a zoom lens fixing mechanism which is easy to assemble with a simple and automatic procedure for the lowering of production cost and improvement of production efficiency.

Conventionally, a zoom lens fixing mechanism, as shown in FIG. 4, comprises a cam sleeve (31), a fixing sleeve (32), a front lens holder (33), a back lens holder (34), four rollers (38, 39, 40, and 41), and a back cover (37). After fitting of the front lens holder (33) to the rear lens holder (34), an end of the front lens holder (33) is placed in the fixing sleeve (32), and then to the cam sleeve (31) for assembly, The cam sleeve (31) has a long slot (311) and three cam slots (312) on its body, and the fixing sleeve (32) has a cam slot (321) and three long slots (322) corresponding to the long slot (311) and the cam slots (312) of the cam sleeve (31).

The front lens holder (33) has three screw holes (35) and the rear lens holder (34) has a screw hole (36) corresponding to the cam slot (321) and long slots (322) of the fixing sleeve (32) and the long slot (311) and cam slots (312) on the cam sleeve (31). Before fitting of the roller (41) to the screw hole (36) on the rear lens holder, the roller (41) must be caused to pass the long slots (311) on the cam sleeve (31) and the cam slot (321) of the fixing sleeve (32). On the other hand, the rollers (38, 39, and 40) must be caused to pass the three cam slots (312) on the cam sleeve (31) and the three long slots (322) on the fixing sleeve (32) before they are fitted to the three screw holes (35) on the front lens holder (33), while the roller (41) passes through the long slot (311) of the long sleeve (31) and the cam slot (321) on the fixing sleeve (32), and is fitted to the screw hole (36) on the rear lens holder (34). Assembly of the zoom lens fixing mechanism is finally completed by fitting of the back cover (37). In such a structure, the front and rear lens holders (33 and 34) can be moved in opposite directions by moving of the rollers (38, 39, 40 and 41) in the long slots (311 and 322) and the cam slots (312 and 321). However, as described, the rollers (38, 39, 40 and 41) must be precisely fitted to the long slots (311 and 322) and the cam slots (312 and 321). However, there is a resistance there. If the lens holder (33 or 34) is on a slant, the long slots (311 and 322) cannot align with the cam slots (312 and 321), and the rollers (38, 39, 40 and 41) cannot be fitted to the respective screw holes (35 and 36). Therefore, a lot of time and labor will be wasted in the assembly, and automatic assembly procedure can be implemented, and its production cost cannot be lowered.

In view of the above defects, the inventor has created an improved zoom lens fixing mechanism which makes use of a notch/opening at the end of each of the cam slots and long slots such that first, the rollers can be fitted to the front and rear lens holders, secondly, the rollers are then run into the cam slots and long slots respectively, and finally the back cover is fitted to prevent from falling out of the rollers. With such a structure, the assembly procedure is improved, an automatic assembly process can be implemented, waste of time and labor is minimized, and production cost is lowered.

SUMMARY OF THE INVENTION

The main object of the present invention is to provide an improved zoom lens fixing mechanism to permit implementation of an automated assembling process, to minimize waste of time and labor, to improve assembling efficiency, and to lower production cost.

BRIEF DESCRIPTION OF THE DRAWINGS

The drawings disclose an illustrative embodiment of the present invention which serves to exemplify the various advantages and objectives thereof, and are as follows.

DETAILED DESCRIPTION OF THE PREFERRED EMBODIMENT

Figure 1:
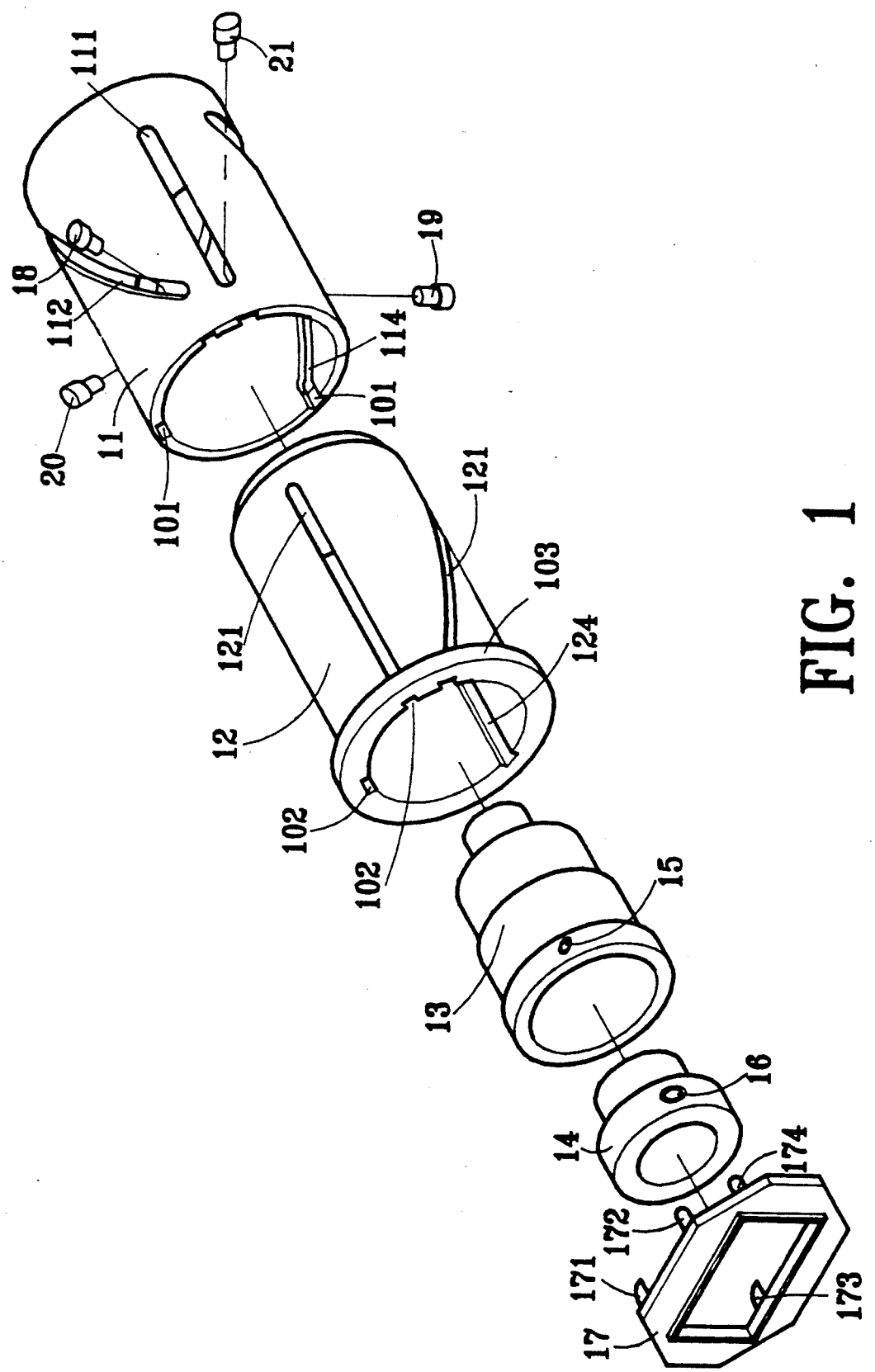
FIG. 1 is a perspective fragmented view of an improved zoom lens fixing mechanism according to the present invention.
Figure 2:
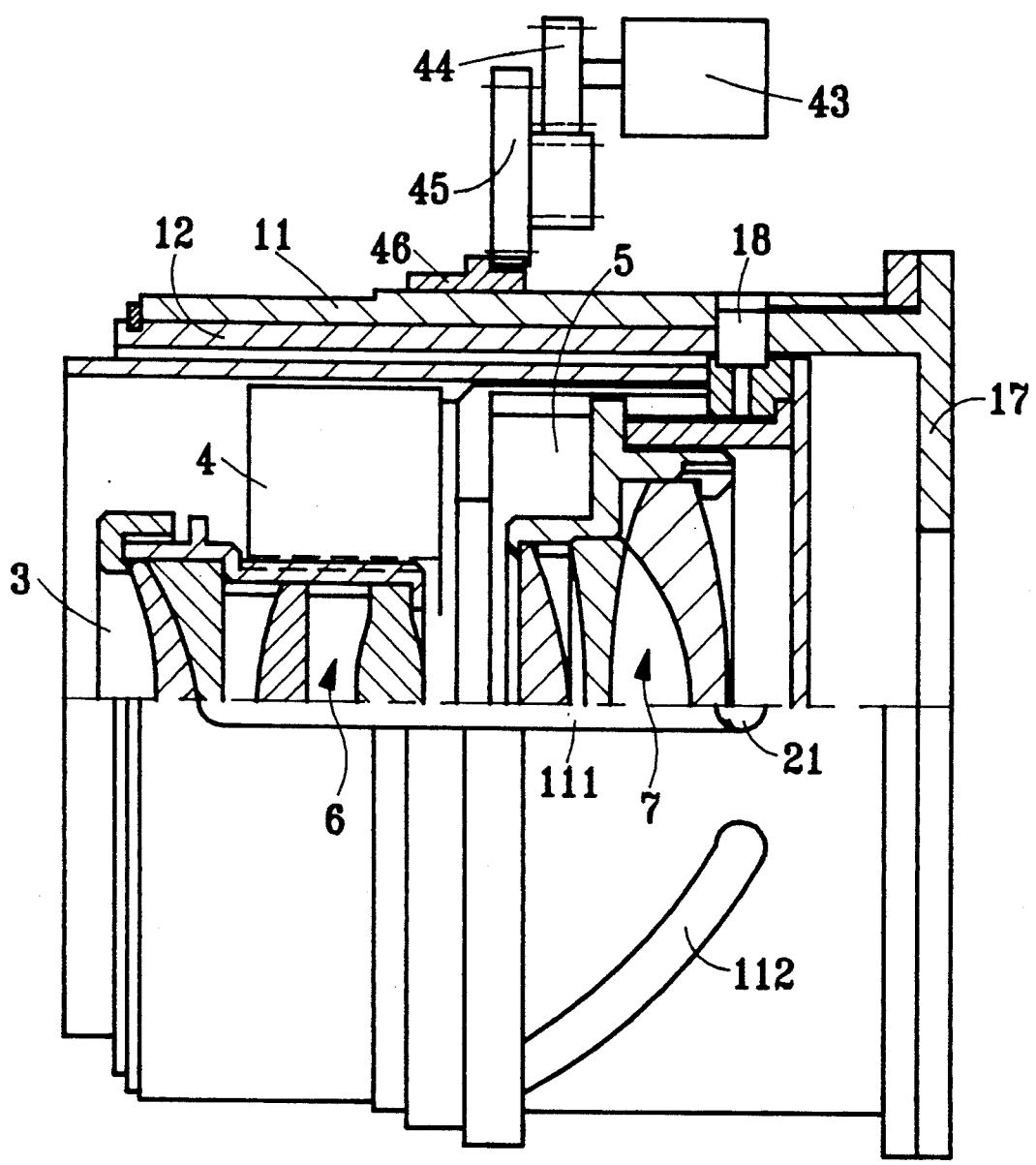
FIG. 2 is a partial sectional view of the improved zoom lens fixing mechanism according to the present invention.

FIGS. 1 and 2 show, respectively, a perspective view and a partly sectional view of an improved zoom lens fixing mechanism according to the present invention. In FIGS. 1 and 2, the zoom lens fixing mechanism comprises a cam sleeve (11), a fixing sleeve (12), a front lens holder (13), a rear lens holder (14), four rollers (18, 19, 20 and 21), and a back cover (17). After assembly of the front lens holder (13) to the rear lens holder (14), an end of the front lens holder (13) is placed in the fixing sleeve (12), and then placed in the cam sleeve (11) for fitting together. The cam sleeve (11) has a long slot (111) and three cam slots (112, 113 and 114) on its body. The fixing sleeve (12) has a cam slot (121) and three long slots (122, 123 and 124) on its body. The long slot (111) and the three cam slots (112, 113 and 114) of the cam sleeve each adjoins a notch (101) which extends to the end of the cam sleeve (11). In the fixing sleeve, the long slots (122, 123 and 124) and the cam slot (121) each has a slot opening (102) extending to the end of the fixing sleeve (12) for a ring body (103). The long slot (111) and the three cam slots (112, 113 and 114) on the cam sleeve (11) are meshable with the cam slot (121) and the three long slots (122, 123 and 124) respectively.

The front lens holder (13) has three screw holes (15) for fixing of the rollers (18, 19 and 20), and the rear lens holder (14) has a screw hole (16) for fixing of the roller (21) so that they can be pushed into the fixing sleeve (12) and the cam sleeve (11) by rolling of the rollers (18, 19, 20 and 21) along the cam slot (121), the opening (102) of the three long slots (122, 123 and 124), the long slot (111) and the notch (101) extending from the cam slot (112). The rollers (18, 19, 20 and 21) can be fixed to the screw holes (15 and 16) in advance by automated equipment to eliminate the waste of labor required in the prior art, in which the rollers (38, 39, 40 and 41) are fixed through the cam sleeve (31) and the fixing sleeve (32) after aligning of two screw holes (35 and 36).

After the assembling described hereinabove, an automatic focusing mechanism (4) is fixed on the front lens holder (13) and has a roller to drive a front lens for focusing, and a roller (21) is fixed to the screw hole (16) on the rear lens holder (14) to drive a rear lens for axial displacement. The final step in the fixing mechanism comprises attaching a back cover (17) by pushing the four back cover pins (171, 172, 173 and 174) into the corresponding notches (101) in the cam sleeve (11) and slot openings (102) in the fixing sleeve (12).

Figure 3:
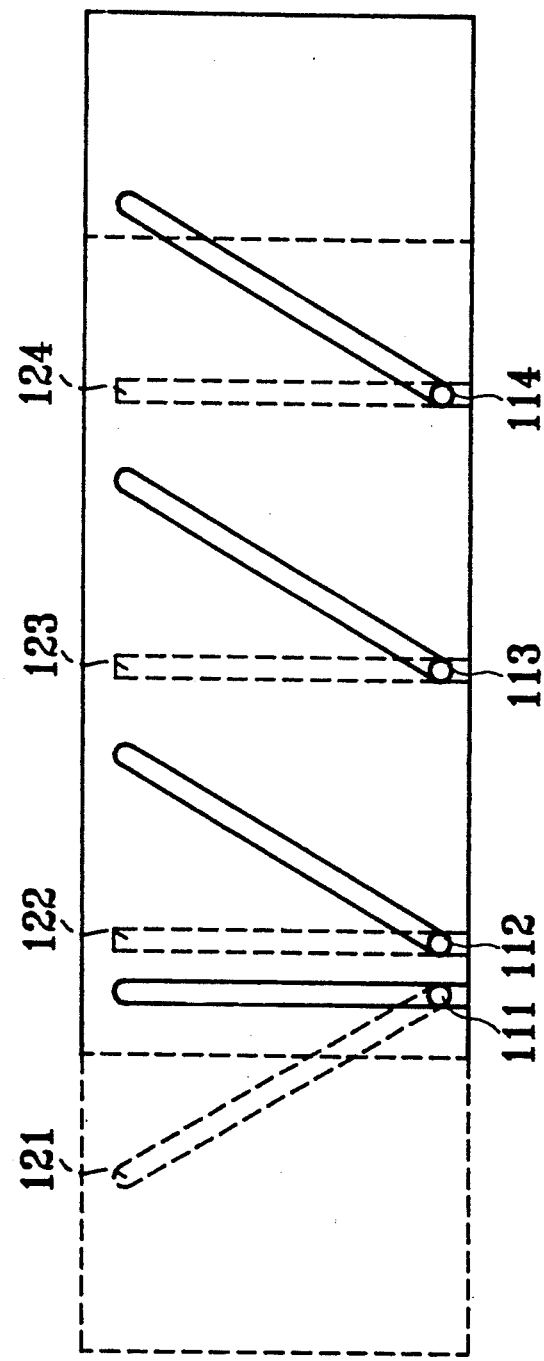
FIG. 3 is a developed view of the cam sleeve and fixing sleeve which have been assembled for the improved zoom lens fixing mechanism according to the present invention.
Figure 4:
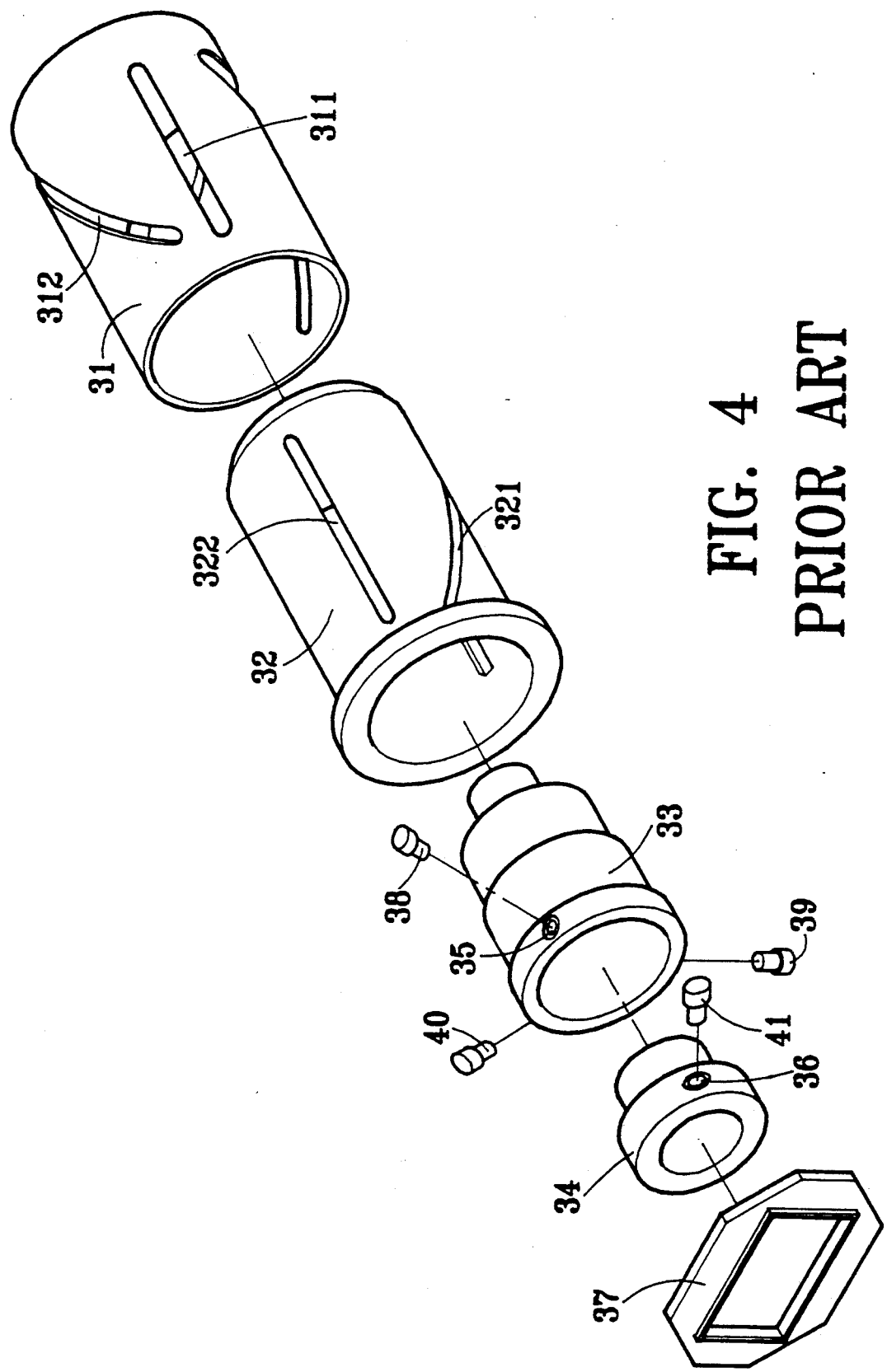
FIG. 4 is a perspective fragmented view of a conventional zoom lens fixing mechanism.

Please refer to FIGS. 2 and 3, which show a partially sectional view and a developed view, respectively, of the improved zoom lens fixing mechanism according to the present invention. Upon operating of a motor (43), a driving ring (46) is driven via a reducing gear (44), and consequently the cam sleeve (11) is rotated by movement of the driving ring (46). Then, the roller (18) moves along the cam slot (112), and the front lens holder (13) is displaced axially, while the roller (21) moves along the cam slot (121) so that the rear lens holder (14) rotates in a direction opposite to the front lens holder (13). The rear lens holder (14) acts as a cylindrical cam to drive a rear lens to move axially. Therefore, the lenses (6 and 7) move axially in opposite directions for zooming purpose.

According to the present invention, each of the long slots (111, 121, 122 and 123) has a notch (101) at their respective ends and each of the cam slots (112, 113, 114) and 121) has an opening (102) at their respective ends, the front lens holder (13) and the rear lens holder (14) can be assembled together and then fitted with the rollers (18, 19, 20 and 21) to become an assembly for placing into the fixing sleeve (32) and the cam sleeve (31) by inserting the rollers (18, 19, 20 and 21) into their corresponding notches (101) and/or openings (102), and finally the back cover (17) is fixed by means of the pins (171, 172, 173 and 174) to prevent from falling out of the rollers (18, 19, 20 and 21). Therefore, the entire assembly procedure is simple and time-saving. It can lower production cost, and it is a procedure which is suitable for automatic production for the highest production efficiency.

As indicated, the structure herein may be variously embodied. Recognizing various modifications will be apparent, the scope hereof shall be deemed to be defined by the claims as set forth below.

What is claimed is:

1. An improved zoom lens fixing mechanism comprising:
   (a) a fixing sleeve having a cam slot and three long slots, each of said slots having slot openings extending through a longitudinal end of said fixing sleeve;
   (b) a cam sleeve having a long slot and three cam slots, each of said slots adjoining a notch extending through a longitudinal end of said cam sleeve;
   (c) a front lens holder having three screw holes;
   (d) a rear lens holder having one screw hole;
   (e) four rollers each of said rollers being adapted to screw into one of said screw holes;
   (f) a back cover having four back cover pins, each of said back cover pins capable of being tightly inserted into one of said slot openings and one of said notches; and
   (g) wherein said cam sleeve being sleevable around said fixing sleeve, said cam slot in said fixing sleeve being meshable with said long slot in said cam sleeve, and each of said long slots in said fixing sleeve being meshable with a corresponding cam slot in said cam sleeve, whereby each of said rollers being first screwed into one of said screw holes and becoming engaged with one of said cam slot/long slot combinations by travelling through each of said notches and said slot openings, further said rollers being prevented from falling out of said slots by said back cover pins which are inserted into said notches and slot openings.

* * * * *